Oct. 3, 1939. W. H. HUNTER 2,174,724
BRAKE
Filed March 26, 1937 3 Sheets-Sheet 1
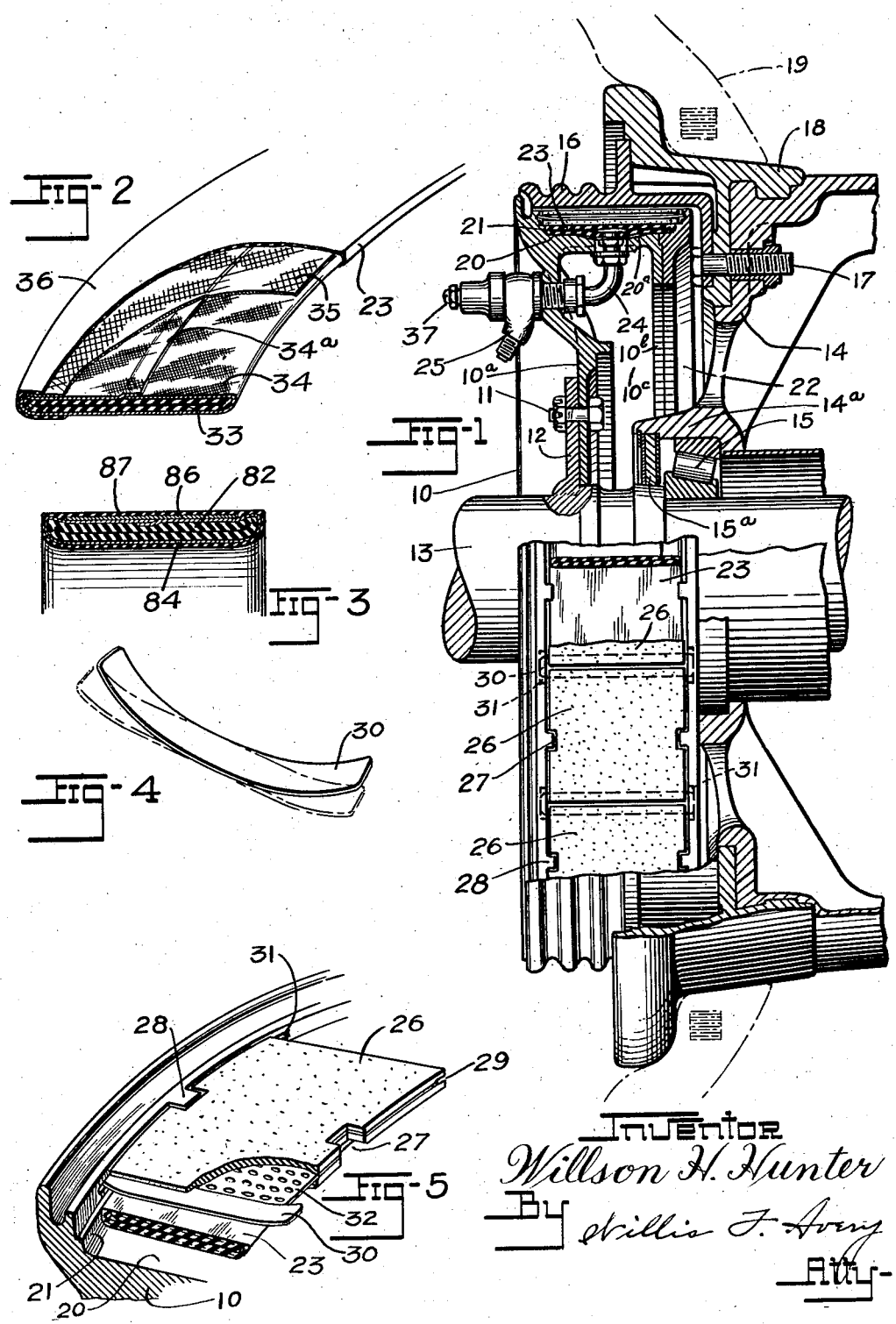
Inventor
Willson H. Hunter
By Willis F. Avery
Atty.

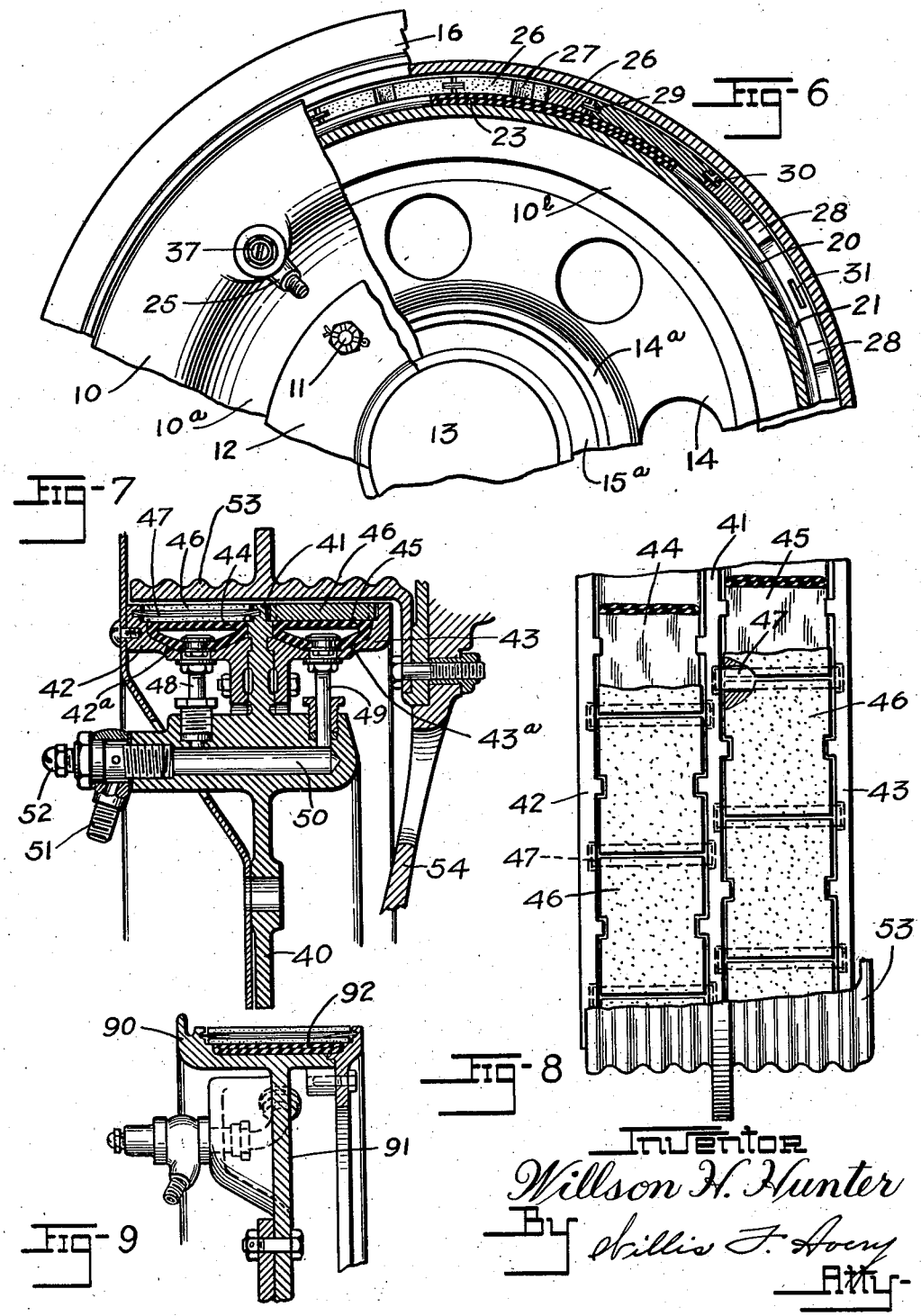

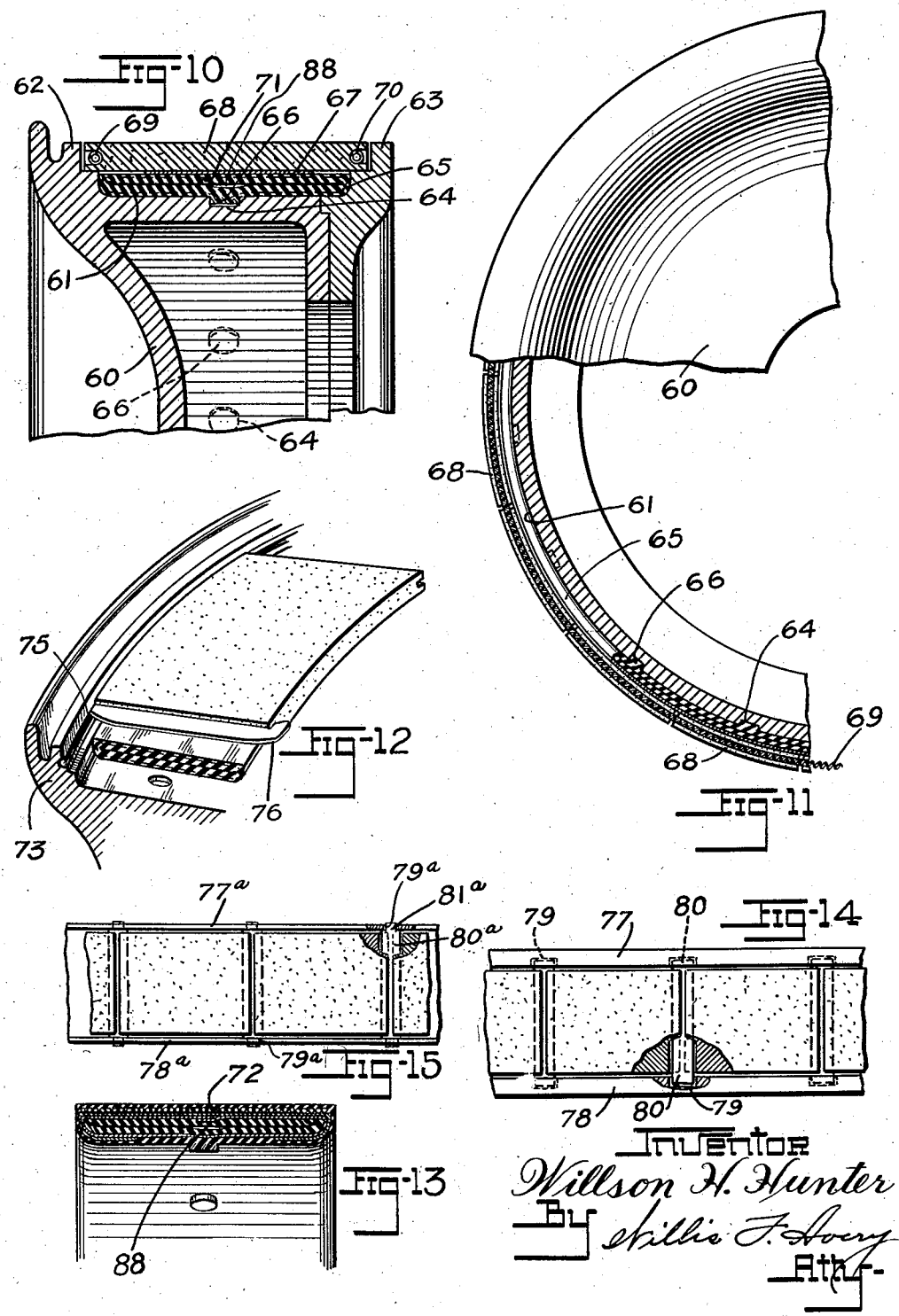

Patented Oct. 3, 1939

2,174,724

UNITED STATES PATENT OFFICE 2,174,724

BRAKE

Willson H. Hunter, Akron, Ohio, assignor to The B. F. Goodrich Company, New York, N. Y., a corporation of New York Application March 26, 1937, Serial No. 133,157

21 Claims. (Cl. 188—152)

This invention relates to brakes for retarding the rotation of rotatable bodies such as the wheels of aircraft and other vehicles, and pertains especially to brakes operated by fluid pressure.

The principal objects of the invention are to provide dependable application of directly applied braking power, to provide efficiency of operation, to provide facility of maintenance and repair, to provide a high degree of equalization in the distribution of braking pressure, to provide positive, quick acting, and uniform release, to provide protection of the tube against the effects of heat, to provide flexible self-conforming action of the friction surface, to provide effective torque absorption, to provide longevity of the braking mechanism, and to provide facility of manufacture and assembly.

Further objects are to provide non-fouling anchorage of the braking elements, to provide for reduction of length of the moment arm from the braking surface to the position of support thereof, to provide effective anchorage of the movable braking elements without weakening of the torque frame or the elements, to provide effective bleeding of air from the braking element at a position close to the braking element and with simplicity of structure, to accomplish the protection of the brake surfaces from foreign matter while effectively retaining the brake blocks in place, and to avoid distortion and failure of the brake blocks.

These and other objects will appear from the following description and the accompanying drawings.

Of the drawings:

Fig. 1 is an elevation, partly broken away and partly in section, of a wheel, such as is employed on an airplane landing gear, showing the invention in one of its forms as applied to such wheel, a portion of the pneumatic tire being shown in dot and dash lines.

Fig. 2 is a perspective view, partly in section, of one form of the expander tube employed therein, parts being broken away to show its construction.

Fig. 3 is a sectional view of another form of expander tube which may be employed therein.

Fig. 4 is a perspective view of one of the block-retaining and retractor springs, its unstressed position being shown in full lines and a deflected position being shown in dot and dash lines.

Fig. 5 is a detail perspective view of a portion of the torque frame, the expander tube, one of the brake blocks, and one of the retractor springs in assembled relation, parts being broken away.

Fig. 6 is a side elevation partly broken away and partly in section, of the wheel shown in Fig. 1.

Fig. 7 is an axial cross-sectional view of another embodiment of the invention, taken at the position of the fluid connections, parts being broken away.

Fig. 8 is a view of the same looking radially of the brake drum, the view showing only a portion of the brake with the brake drum broken away to expose the brake blocks, and the blocks broken away to expose the tube and retractor springs.

Fig. 9 is a fragmentary sectional view of a further embodiment of the invention taken near the fluid connection.

Fig. 10 is a cross sectional view of a further embodiment of the invention, parts being broken away.

Fig. 11 is a side elevation of the same, parts being broken away and parts shown in section.

Fig. 12 is a perspective view, partly in cross-section, showing another embodiment of the invention.

Fig. 13 is a perspective view of a portion of a modified form of expander tube as used in the form of the invention shown in Figs. 10 to 12.

Fig. 14 is a face view of a portion of the torque frame having a modified form of the invention in which the assembled brake blocks are retained solely by retractor springs, parts being broken away to expose one of the springs.

Fig. 15 is a view like Fig. 14 showing a further modified construction suitable for use with a sheet metal torque frame.

Referring to the drawings, in the embodiment of the invention shown in Figs. 1, 2, and 4 to 6, the numeral 10 designates the torque frame which may be fastened, as by bolts 11, to a torque flange 12 of a torque shaft 13. The torque frame is located adjacent a wheel 14 rotatably mounted with respect to the torque shaft, as on roller bearings 15, and has a brake drum 16 fixed thereto, as by bolts 17. A rim 18, of the wheel is adapted to seat a pneumatic tire 19.

The torque frame is formed with a circumferential channel 20 underlying the brake drum 16 and defined by a fixed flange 21 at one side and a removable flange 22 at the other. Seated within the annular channel 20 with its inner face in continuous contact therewith is an annular expander tube 23 adapted to force the braking surface against the drum when the tube is inflated. The expander tube is connected by an L-shaped metal stem 24 through the torque frame 10 to a source of fluid pressure (not shown), such connection conveniently being made through a swivel intake fitting 25. The annular channel 20 is formed with a localized depression 20ª at the position of the connection 24 so that the tube walls will remain spaced apart at this position to facilitate initial entry at this position of the braking fluid.

Mounted in the channel 20, over the expander tube, are a plurality of brake blocks 26 preferably formed of molded, heat resistant composition. These blocks are adapted to be forced into frictional engagement with the brake drum when the expander tube is inflated and to clear the drum when the tube is deflated.

To transmit the torque from the brake blocks to the torque frame, without any wedging action tending to spread the torque frame or lock the blocks, the blocks are formed with rectangular notches 27 in their circumferential margins adapted to receive rectangular lugs 28 formed on the flanges.

To provide for retaining the blocks between the flanges, to automatically retract them from the brake drum when the expander tube is deflated, to assist in transmitting the torque from the blocks to the torque frame, to prevent the radiation of heat from the brake drum to the expander tube, and to protect the expander tube from foreign matter, the blocks 26 are formed with axially extending grooves 29 in their axial margins to receive leaf springs 30 of metal, each of which engages opposing grooves 29 of consecutive blocks 26 and bridges the space therebetween entirely above the expander tube. The ends of the retractor springs 30 engage loosely in sockets 31 formed in the fixed and removable flanges, the arrangement being such that all of the blocks are retained by the torque frame in floating relation thereto and the torque frame may be inserted into and removed from the brake drum with the blocks and expander tube assembled thereon as a unit without danger of accidental disassembly.

To guard against contamination of the braking surfaces by grease or other foreign matter, the torque frame 10 is closed on its exposed face by a continuous web 10ª and has a radially disposed annular flange 10ᵇ depending inwardly from its expander tube supporting surface so as to define a substantially enclosed grease trapping cavity 10ᶜ. The wheel 14 is formed with a hub 14ª which extends into this cavity a sufficient distance to prevent throwing of grease or oil from the bearing 15 onto the braking surfaces. A grease retaining washer 15ª of felt may also be mounted between the hub 14ª and the shaft 13.

To provide for retracting the blocks, the retractor springs 30 are curved lengthwise, as best shown in Fig. 4, so as progressively to contact the under shelf of the spring slots in the blocks from the center outwardly, and in assembled position in the brake, the springs which are thinner than the slots, are somewhat flattened so as to tend to force the blocks radially away from the brake drum.

This construction not only provides for uniform and quick acting release of the brake blocks upon release of pressure in the expander tube, but also applies the spring pressure medially of the face of the blocks which is the zone of maximum expander tube pressure where they are best adapted to take the load without causing undesirable distortion of the blocks and breaking of the blocks at the margins and corners. The contact of the springs with the shelves of the blocks is also well away from the mouths of the slots so as to reduce the leverage of the springs tending to break the shelves from the blocks.

To resist further the destructive effect of heat on the expander tube by radiation from the brake drum at positions between the brake blocks, the retractor leaf springs are preferably of highly polished stainless steel or are coated with a corrosion resistant metal, such as cadmium, polished to a high finish so as to reflect a large portion of the radiated heat. This is in addition to the guarding function of the springs.

By fitting the ends of the retractor springs in sockets as distinguished from confining them in continuous annular grooves in the flanges, a construction later described herein, the springs may be employed entirely in place of the lugs 28 and notches 27 to retain the blocks against circumferential movement as shown in Figs. 14 and 15, more fully described hereinafter, or the springs may be used in addition to the lugs and notches for transmitting torque from the blocks to the frame where the braking loads are extremely high.

By employment of the simple leaf springs extending entirely out of contact with the expander tube the channel formed for the reception of the expander tube is unconstricted throughout its extent, permitting the use of an expander tube of uniform cross-section and of minimum radial dimensions, and as a result the expander tube additionally is relieved of localized bending strains.

To provide against breakage of the brake blocks under the torque applied thereto and to reinforce the blocks against bending under the force of the expander tube, a reinforcing layer 32 of textile material, perforated metal, wire cloth, or other suitable reinforcing material may be embedded within the blocks or on their under faces during manufacture thereof. Such reinforcement may be located only in the region of greatest stress, for example locally at the center, the margins, or the corners.

The expander tube may be made of soft vulcanized rubber and fabric construction. Where, however, it is desired to employ mineral oil or similar fluids for expanding the same, an elastic rubber like composition such as plasticized polymerized vinyl chloride compositions, neoprene compositions, or the like, resistant to oils, may be used for lining the tube or for the tube wall itself. In order to protect the resilient elastic material of the tube from excessive wear and to reinforce the tube, the elastic lining 33 thereof preferably has applied thereto a covering 34 of bias laid fabric which has its seam 34ª preferably at the upper medial zone of the tube so that an effectively balanced expansion of the tube will result, and an additional reinforcing layer 35 of another fabric or cord such as tire breaker fabric preferably is applied to its outer face preferably across substantially the entire width of the tube to stiffen it against local distortion as at the spaces between the ends of the brake blocks. A rubber protective layer or layers 36 desirably of heat resistant rubber surrounds the entire tube or is applied to the braking face thereof, and preferably is formed with a flat outer face across its width, so that expansive pressure will be transmitted directly to the blocks entirely across their width. To this end, the increased stiffness afforded by the fabric layers 34 and 35 also contribute.

The rubber covering permits the tube to be more accurately molded to the dimensions of the space it is to fill thereby reducing the necessary expansion of the tube, provides a surface having a high coefficient of friction with the material of the channel and the brake blocks, and provides resistance to burning of the tube under the heat incident to braking. The bias laid fabric 34 and the breaker fabric 35, and especially the latter by their elasticity assist in retracting the tube to its original form and dimensions and serve to distribute the braking load uniformly across the width of the tube as also to reinforce the tube against internal pressure, especially at unsupported zones as for example at the margins and between blocks.

To avoid the use of a plurality of connections to the expander tube, and at the same time to provide effectively for the escape of entrapped air in filling the brake system with oil or other fluid, a bleeder valve 37 is provided directly on the fluid connection and permits air being worked out of the expander tube by pulsation of the fluid while the bleeder is slightly opened. By this arrangement any fluid spilled from the bleeder in filling the system is kept away from the braking surfaces.

Where a large braking area is required in proportion to the diameter of the brake, a duplex brake of the form illustrated in Figs. 7 and 8 may be employed. In this form of the invention, the torque frame 40 is formed with a single circumferential flange 41, and a pair of rings 42, 43 are bolted thereto, one on each side thereof, so as to define therewith a pair of circumferential channels to receive a pair of expander tubes 44, 45. The channels 42, 43 may be locally depressed, as at 42ª, 43ª, at the positions of the fittings 48, 49, so that the tube walls will remain spaced apart at these positions to facilitate initial entry of the braking fluid.

Each expander tube supports a series of brake blocks 46 which are retained by retractor spring 47 in the manner heretofore described, the flange 41 and the marginal flanges of the movable rings 44, 45 having sockets to loosely receive the ends of the springs. The metallic connections or nozzles 48, 49, of the expander tubes are connected to a common manifold 50 to which a single connector fitting 51 having a bleeder valve 52 is connected so as to operate the expander tubes in unison. A single brake drum 53 spans both rows of brake blocks and is fixed to the wheel 54. This construction provides for more uniform pressure across the face of the brake drum than would be possible with a single expander tube of comparable width due to the tendency of such a tube to change its shape during inflation.

The duplex tube of the invention provides increased articulation of brake surface and therefore insures positive contact of the brake blocks at all positions over the surface of the brake drum. By using a plurality of expander tubes, the full capacity of the system is reduced, the distribution of braking power is more uniform, and the strength of the expander tubes are increased without increasing the thickness of their walls. This construction also provides greater retractor spring action by keeping the springs of short length, and provides greater anchorage of the brake blocks by the provision of more brake block engaging lugs and retractor springs for a given circumferential spacing.

In the embodiment of Figs. 10 and 11 provision is made for transmitting the braking torque from the braking surface directly to the expander tube and thence to the torque member. In the construction shown in Figs. 10 and 11 the torque member 60 may be formed with a circumferential channel 61 defined by stepped flanges 62, 63, the flange 63 being removable. The bottom of the channel is formed with a series of recesses 64, and the expander tube 65 is formed on its inner face with integral buttons 66 to engage the recesses and to prevent circumferential movement of the tube with respect to the channel. The outer face of the tube preferably has a layer 67 of material having a high coefficient of friction with relation to the brake block material vulcanized thereto. The layer 67 may be of rubber or other material having elastic properties so as to assist in returning the tube to its normal shape after a braking operation, and may also have heat resisting properties or contain heat resisting materials such as asbestos, mineral fiber, or the like so as to protect the tube from the heat of braking. This band not only provides a frictional surface to coact with the blocks but also resists non-uniform expansion of the tube across its width.

To retain the brake blocks 68 in place, they are formed with circumferential grooves in their circumferential margins to receive coil springs 69, 70, each of which extends around the circumference of the brake and has its ends hooked together so as to form an elastic band. In use the brake blocks may creep around the channel but such movement is resisted by friction of the face of the expander tube.

A layer of coarse fabric 71 is preferably built into the face of the expander tube, and extends around its edges to carry the torque load to the torque frame so as to distribute the load. All braking effort is transferred through the tube, and no lugs or notches are required to retain the blocks, thereby permitting the use of longer brake blocks without objectionable jamming of anchorages, and while nevertheless obtaining good uniformity of distribution of the braking pressure circumferentially of the drums. If desired the braking surface may be supplied by a single braking element extending throughout substantially the entire circumference.

As shown in Fig. 13 a layer of circumferentially disposed cords 72 may be employed for preventing undesirable distortion of the tubes when expanded, the stretch of the cords being sufficient to provide proper braking action, and the elasticity of the cords being effective to provide retracting force. This tube construction is not limited to the embodiment of Fig. 10 but is of general application. The elasticity of the cords is sufficient to assist materially in returning the tube to its original position, thereby reducing the load on the retractor springs.

In the embodiment of Fig. 12, the flanges 73 of torque member may be formed with inwardly facing continuous annular grooves 75 for retaining leaf retractor springs 76 of the type illustrated in Fig. 4. These springs also engage an adjacent lateral groove of the brake blocks, as in the form of the invention illustrated in Fig. 1 so that the springs and the blocks may float circumferentially and the blocks are retained and guided by the springs moving in the slots. In such a construction, as the springs are not restrained circumferentially of the flanges, greater flexibility and freedom for self adjustment of the parts is made possible, while the springs are nevertheless effective for their retractive function.

In the embodiment of Figs. 14 and 15 provision is made for avoiding the use of anchoring lugs and notches on the torque member and brake blocks, the springs themselves being used to provide the anchorages. In Fig. 14 side flanges 77 and 78 of the torque member are formed with sockets 79, 79 for retaining the ends of springs 80, 80 which may be of the construction of Fig. 4. The springs in addition to their retractive function, serve to transmit the braking torque from the brake blocks to the flanges of the torque member.

Where a brake of light construction is desired, the torque frame may be constructed of fabricated metal such, for example, as stamped sheet metal and the brake block retaining channel formed thereof may be perforated in its flange portions 77ª, 78ª as shown in Fig. 15 by apertures 79ª, the retractor springs 80ª being formed with reduced ends 81ª to pass therethrough for retaining the springs in the apertures.

To provide an expander tube having a maximum radial displaceability of its outer wall under expansion without consequent narrowing of the tube, the tube in any of the constructions heretofore described desirably may be formed, as shown in Fig. 3, with a tube body 82 normally of extended U-shape, or in other words flat throughout the greater part of its lateral extent in cross-section but having turned up margins, the top and bottom walls of the tube body being normally in contact with each other. The concavity in the outer portion of the tube body has the result of permitting distension of the outer wall without a drawing in of the sides of the tube, so that a strong and direct braking pressure is obtained at the margins of the tube as well as at its middle. The turned up ends of the tube body also have the result of lessening the sharpness of the crease at the sides and relieving flexing strains at these zones. An enclosing layer 84 of bias laid square woven fabric and a stiffening elastic layer 86 of fabric or cord or other suitable material preferably also is applied, as well as an enclosing layer 87 of rubber preferably formed to provide a flat face across the width of the tube. Where a fabric or other reinforcement 86 is employed it is preferably made narrower than the top wall of the tube so that the flexibility of the portions of the walls of the tube subjected to greatest bending, adjacent the turned up margins, is not impaired.

While the walls of the fluid cavity are preferably so formed as to be in contact with each other and therefore to provide a minimum space for fluid, I find it also desirable to provide a slight trough 88 (see Figs. 10 and 13) between the top and bottom walls around the tube in alignment with the fluid connection to provide drainage from all parts of the tube to the fluid connection without pocketing the fluid and also to provide uniform initial application of pressure around the brake.

The trough 88 may be provided as a groove formed in the inner face of the tube or it may be provided as a groove in the torque member into which the inner wall of the tube will seat, or both.

In the form of torque member 90, illustrated in Fig. 9, the supporting flange 91 is arranged in an intermediate position with respect to the expander tube 92, so as to provide a strong but light construction effective to dissipate heat received by it from the brake directly to the surrounding atmosphere to which it is exposed, while at the same time permitting cooling of the margins of the torque member beneath the expander tube by convection currents of air. This is advantageous especially in heavy aircraft where heating of the brakes has been a problem.

Variations may be made without departing from the scope of the invention as it is defined by the following claims.

I claim:

1. A brake structure comprising a brake member, a cooperating brake element, and means comprising an expansible member for applying a braking force to the element, the expansible member having a pressure-transmitting wall unattached to the element and including stiffening means effective to maintain the wall substantially flat across its entire width to transmit the braking pressure to the element simultaneously across substantially the entire pressure transmitting wall.

2. A brake structure comprising a brake drum, a brake element, means comprising an expansible tube for applying a braking force to the element, said tube having a pressure applying wall unattached to the element and including a flat face extending across its entire width and stiffening means for maintaining said face in its substantially flat form across its entire width under distension of the tube.

3. A brake structure comprising a torque frame and a brake member mounted for movement of one with relation to the other, an expander tube interposed between the frame and the member, a series of brake elements interposed between the expander tube and the member, said elements having circumferentially extending grooves in their side margins, and resilient retractor means engaging the grooves in adjacent elements for normally holding the elements away from the brake member.

4. A brake structure comprising a torque frame, a braking face associated therewith, a braking element adapted to engage said face, and an inflatable expander for effecting such engagement, said expander having a body comprising rubber composition and an inner lining of elastic non-rubber oil-resisting material.

5. A brake structure comprising a torque frame, a brake drum surrounding the same, a series of brake blocks adapted to engage the face of said drum, and an inflatable expander tube for effecting such engagement, said tube having an expansion limiting layer of cords disposed in the direct circumferential direction at its outer face.

6. A brake structure comprising a torque frame, a brake drum surrounding the same, a series of brake blocks adapted to engage the face of said drum, and an inflatable expander tube for effecting such engagement, said tube having means disposed at positions circumferentially along its inner face for interlocking with the torque member.

7. A brake structure comprising a torque frame, a brake drum surrounding the same, a series of brake blocks adapted to engage the face of said drum, and an inflatable expander tube for effecting such engagement, said tube having a series of projections integral with the tube on its inner face for engaging said torque member.

8. A brake structure comprising a torque frame, a brake drum opposed to the same and rotatable with relation thereto, an expander tube supported by the torque member, and a series of brake blocks supported by said tube in position to engage said drum, said torque member and said blocks being locked against rotation with respect to each other by leaf spring members extending axially between the brake blocks, each spring member engaging said torque member and the ends of two adjacent blocks, and projections on the torque member extending into notches in the side margins of said blocks.

9. A brake or the like frictionally engageable structure comprising supporting means, an expansible tube supported by said means, a friction surface, a plurality of shallow friction blocks of composition material each having a face thereof against said tube and a friction face opposite thereto engageable with said friction surface, and retracting springs engaging the composition blocks themselves and being disposed entirely within the shallow depth of the blocks.

10. A brake or the like frictionally engageable structure as defined in claim 9 in which each of the said retracting springs engages two adjacent blocks and the said supporting means.

11. A brake or the like frictionally engageable structure comprising supporting means, an expansible tube supported by said means, a friction surface, a plurality of shallow friction blocks of composition material each having a face thereof against said tube and a friction face opposite thereto engageable with said friction surface, and retracting springs each engaging a plurality of the composition blocks themselves and being disposed entirely within the shallow depth of the blocks.

12. A brake or the like frictionally engageable structure comprising supporting means, an expansible tube supported by said means, a friction surface, a plurality of shallow friction blocks of composition material each having a face thereof against said tube and a friction face opposite thereto engageable with said friction surface, the opposed margins of adjacent blocks being grooved, and retracting leaf springs each engaging said supporting means and two of said blocks in the grooved margins of the latter.

13. A brake or the like frictionally engageable structure comprising supporting means, an expansible tube supported by said means, a friction surface, a plurality of friction blocks of composition material movable against said friction surface upon expansion of said tube, and retracting springs engaging said supporting means and the composition blocks directly and disposed entirely between the pressure-applying and friction faces of the blocks.

14. A brake or the like frictionally engageable structure comprising a channeled supporting member, an expansible tube disposed within the channel of said member, a friction member, a plurality of friction blocks movable against said friction member upon expansion of said tube and disposed within said channel, and leaf retracting springs each engaging the margins of two adjacent blocks and having its ends engaging the side walls of said channel.

15. A brake or the like frictionally engageable structure as defined in claim 14 in which each leaf spring engages in recesses in the opposed margins of adjacent blocks and bears in the recesses at substantially the mid-point transversely of the expansible tube.

16. A brake or the like frictionally engageable structure as defined in claim 14 in which the said supporting member comprises a plurality of channels each containing an expansible tube and a set of the friction blocks and leaf springs in the arrangement claimed, the sets of leaf springs engaging the walls of the channels in staggered relation.

17. A brake or the like frictionally engageable structure comprising supporting means, an expansible tube supported by said means, a friction surface, and a plurality of friction elements unattached to said tube and movable against said friction surface upon expansion of said tube, said tube in the retracted position being adapted to close with its interior walls substantially in contact and being of a form to fill the space between the supporting means and each friction element, and the tube having a pressure-transmitting wall cooperable with said elements including stiffening means effective to maintain the walls substantially flat entirely across its width to transmit pressure against said elements simultaneously across substantially the entire wall.

18. A brake or the like frictionally engageable structure as defined in claim 17 in which in the retracted position of the parts the said tube is adapted to close entirely except for a small drainage passage and in its closed form has marginal portions of its inner wall turned toward the pressure-transmitting wall whereby expansion of the tube is effected substantially without narrowing of the tube.

19. A brake or the like frictionally engageable structure as defined in claim 17 in which a plurality of expansible tubes are supported side by side upon the supporting means, each tube having a set of cooperating braking elements and retracting springs, and means are provided for expanding the tubes simultaneously.

20. A brake or the like frictionally engageable structure comprising supporting means, a plurality of expansible tube elements supported side by side upon said means, a friction surface, a plurality of friction elements engageable with said friction surface upon expansion of said tube elements and means connected with both tubes for supplying pressure fluid to them simultaneously.

21. A brake or the like frictionally engageable structure comprising supporting means, a friction surface, friction means engageable with said friction surface, expansion means comprising a plurality of expansible tube elements adapted to urge said friction means into contact with said friction surface upon expansion of said tube elements and means connected to both tubes for supplying pressure fluid to them simultaneously.

WILLSON H. HUNTER.